(12) United States Patent
Li

(10) Patent No.: US 7,782,328 B1
(45) Date of Patent: Aug. 24, 2010

(54) METHOD AND APPARATUS OF VIDEO GRAPHICS AND AUDIO PROCESSING

(75) Inventor: Raymond Li, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 09/047,320

(22) Filed: Mar. 24, 1998

(51) Int. Cl.
*G06F 13/14* (2006.01)
*G06F 13/18* (2006.01)
*G06T 1/00* (2006.01)

(52) U.S. Cl. .................. 345/520; 345/522; 345/535
(58) Field of Classification Search ................ 345/302, 345/520, 501–503, 507, 515, 516, 522, 535, 345/566, 567
See application file for complete search history.

(56) References Cited

U.S. PATENT DOCUMENTS

| 5,553,220 A * | 9/1996 | Keene ...................... 345/520 |
| 5,559,999 A * | 9/1996 | Maturi et al. .............. 713/400 |
| 5,630,174 A * | 5/1997 | Stone, III et al. ............ 710/63 |
| 5,732,224 A * | 3/1998 | Gulick et al. .............. 710/100 |
| 5,752,010 A * | 5/1998 | Herbert ..................... 345/509 |
| 5,761,462 A * | 6/1998 | Neal et al. ................. 710/129 |
| 5,761,698 A * | 6/1998 | Combs ..................... 345/520 |
| 5,774,131 A * | 6/1998 | Kim ......................... 345/503 |
| 5,802,330 A * | 9/1998 | Dutton ..................... 710/116 |
| 5,812,789 A * | 9/1998 | Diaz et al. ................. 709/247 |
| 5,870,087 A * | 2/1999 | Chau ....................... 345/302 |
| 5,872,577 A * | 2/1999 | Perrin ...................... 345/521 |
| 5,872,942 A * | 2/1999 | Swanstrom et al. ......... 710/305 |
| 6,546,426 B1 * | 4/2003 | Post ......................... 709/231 |

* cited by examiner

*Primary Examiner*—Hau H Nguyen
(74) *Attorney, Agent, or Firm*—Vedder Price P.C.

(57) ABSTRACT

A method and apparatus for combining video graphics processing and audio processing onto the same single chip and/or printed circuit board includes a graphics processing circuit, an audio processing circuit, a local bus, and a bus arbitrator. The local bus couples both the graphics processing circuit and audio processing circuit to the system bus such that each of the circuits may transceive data with the system bus. The bus arbitrator arbitrates access to the local bus between the graphics processing circuit and audio processing circuit. Such arbitration is based on incoming data, which is interpreted and, based on the interpretation, the bus arbitrator routes the incoming data to either the graphics processing circuit or the audio processing circuit. In addition, the bus arbitrator arbitrates outputting data from the graphics processing circuit and the audio processing circuit based on commands received from the CPU.

25 Claims, 4 Drawing Sheets

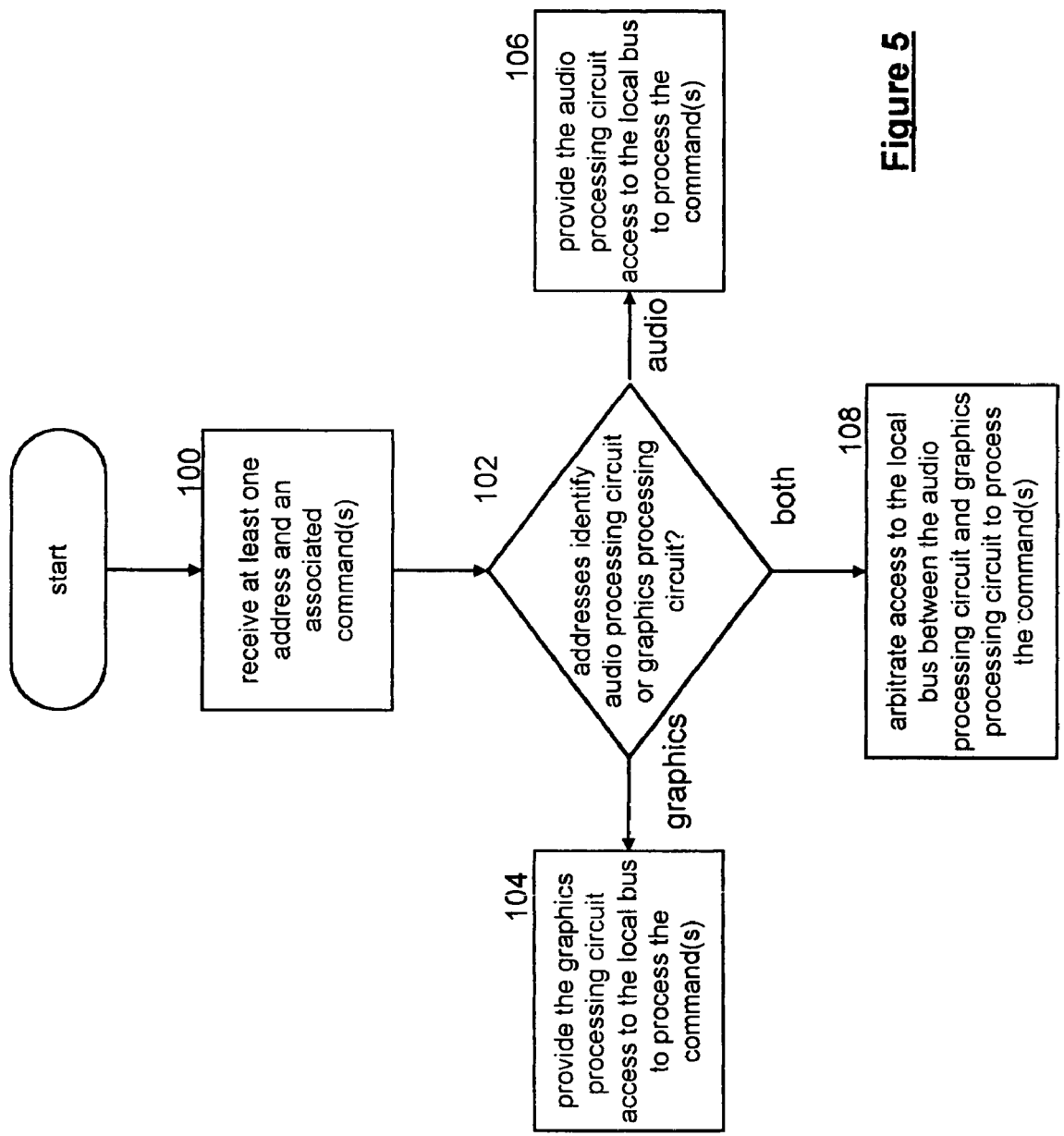

METHOD AND APPARATUS OF VIDEO GRAPHICS AND AUDIO PROCESSING

TECHNICAL FIELD OF THE INVENTION

This invention relates generally to computer peripherals and more particularly to graphics processing and audio processing.

BACKGROUND OF THE INVENTION

Computers are known to include a central processing unit ("CPU"), main memory, system buses, and a plurality of supporting units. Such supporting units include audio processing circuitry, video processing circuitry, graphical user interface modules, etc. Physically, many of the supporting units are mounted or coupled to a motherboard. Each of the supporting units, when coupled to the motherboard, includes a local bus that couples the supporting unit to the system bus.

In operation, when the CPU is inputting, or outputting, data from a supporting unit, it generates an address and a command, which are provided on the system bus. Each of the supporting units, via its local bus, monitors the address bus to determine whether the particular command is directed to it. When the appropriate supporting unit detects that the command is for it, it performs the command. If the command is to input data, the supporting unit stores, and processes—if instructed—, the data provided by the CPU. If the command is to output data, the supporting unit outputs the data via the local bus to the system bus and routes it either to the CPU, or a designated recipient.

In a typical computer, the video graphics processing circuitry is on a separate board than the audio processing circuitry. As such, the video graphics circuit board and the audio processing circuit board each have their own local buses. In addition, they each require coupling to the motherboard and function as totally independent circuits. A typical audio processing circuit board will retail for approximately $30.00, which, in turn, relates to approximately $15.00 of manufacturing costs. With the ever-increasing demand for smaller, more powerful, and less expensive computers, it would be desirable to reduce the cost of including an audio processing circuit.

Therefore, a need exists for a method and apparatus of a graphics circuit and audio processing circuit contained on a single chip and/or printed circuit board.

BRIEF DESCRIPTION OF THE DRAWING

FIG. 5 illustrates a logic diagram of a method for processing graphics and audio in accordance with the present invention.

DETAILED DESCRIPTION OF A PREFERRED EMBODIMENT

Generally, the present invention provides a method and apparatus for combining video graphics processing and audio processing onto a single chip and/or the same printed circuit board. The combined circuit includes a graphics processing circuit, an audio processing circuit, a local bus, and a bus arbitrator. The local bus couples both the graphics processing circuit and audio processing circuit to the system bus such that each of the circuits may transceive data with the system bus. The bus arbitrator arbitrates access to the local bus between the graphics processing circuit and audio processing circuit. Such arbitration is based on incoming data, which is interpreted and, based on the interpretation, the bus arbitrator routes the incoming data to either the graphics processing circuit or the audio processing circuit. In addition, the bus arbitrator arbitrates outputting data from the graphics processing circuit and the audio processing circuit based on commands received from the CPU. With such a method and apparatus, a single local bus may be used for both the graphics processing circuit and audio processing circuit. By combining the audio processing circuit with the video graphics processing circuit, the costs of adding audio processing to a computer is substantially reduced, since the only cost incurred for adding audio is to include an audio codec and the bus arbitration circuit which is in the $2.00 to $3.00 range.

Figure 1:
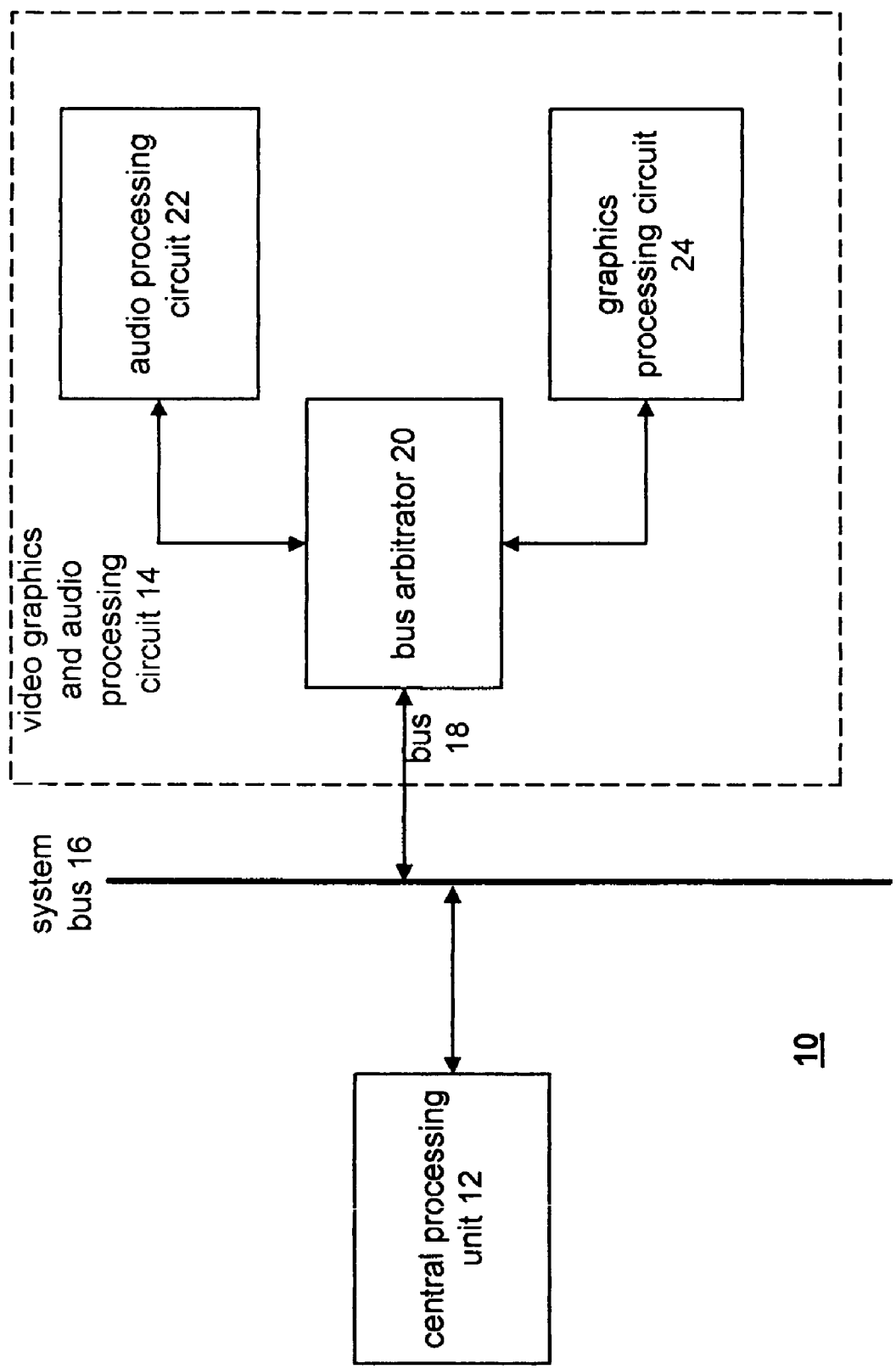
FIG. 1 illustrates a schematic block diagram of a computer system in accordance with the present invention.

The present invention can be more fully described with reference to FIGS. 1 through 5. FIG. 1 illustrates a schematic block diagram of a computer 10 that includes a CPU 12, a video graphics and audio processing circuit 14, and a system bus 16. The video graphics and audio processing circuit 14 includes a local bus 18, a bus arbitrator 20, an audio processing circuit 22, and a graphics processing circuit 24. The audio processing circuit 22 includes circuitry to process analog audio and digitized audio. Such circuitry may include a wave table, audio playback circuitry, audio record, a mixer, and an audio codec. The video graphics processing circuit 24 includes circuitry to process analog video and digitized video signals. Such digitized video signals may be generated by the CPU based on software applications, such as a word processing document, graphics document, reading a CD drive. The analog video signals may come from a television encoder that is coupled to receive television broadcasts, cable broadcasts, satellite broadcasts, VCR transmissions and/or DVD transmissions. The video graphics circuit 24 may be equivalent to the video graphics circuit contained in the All-In-Wonder circuit manufactured and distributed by ATI Technologies.

In operation, the CPU generates commands for inputting and/or outputting data to/from the audio processing circuit and graphics processing circuit. Such commands include an address and an indication as to whether the command is for inputting data, outputting data, and/or processing data. The CPU places the command on the system bus, which is monitored by the bus arbitration circuit 20. When the bus arbitration circuit 20 recognizes the address for either the audio processing circuit 22 or the graphics processing circuit 24, it retrieves the command from the bus. The bus arbitration circuit 20, after interpreting the command, provides the command to either the audio processing circuit 22 or the graphics processing circuit 24. Such an interpretation is based on the address provided by the CPU.

Figure 2:
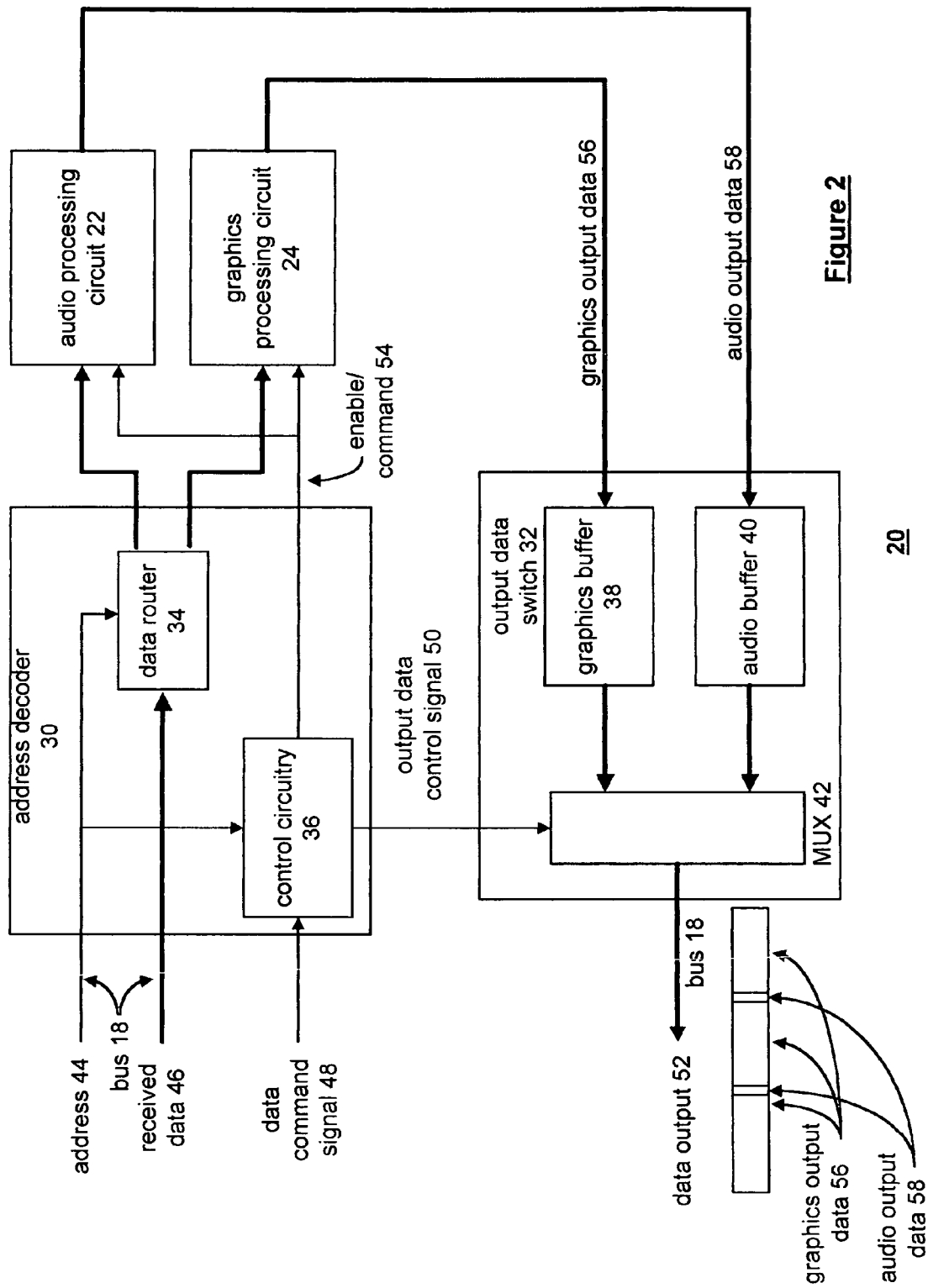
FIG. 2 illustrates a schematic block diagram of the bus arbitration circuit of FIG. 1.

The bus arbitration circuit 20 can be described in greater detail with reference to FIG. 2. As shown, the bus arbitration circuit 20 includes an address decoder 30 and an output data switch 32, both of which are coupled to the audio processing circuit 22 and the graphics processing circuit 24. The address decoder 30 includes a data router 34 and control circuitry 36. The output data switch 32 includes a graphics buffer 38, an audio buffer 40, and a multiplexor 42.

The address decoder 30 is operably coupled to receive addresses 44 and data 46 via the local bus 18. The addresses 44 are provided to the data router 34 and the control circuitry 36. The data router 34 interprets the address 44 to determine whether the received data 46 is for the audio processing circuit 22 or the graphics processing circuit 24. Such an interpretation may be done by a look-up table or other equivalent address matching schemes. Based on the interpretation, the router 34 then acts as a switch to direct the received data 46 to the appropriate circuit 22 or 24.

The control circuitry 36 also interprets the address 44 to provide an enable/disable command signal 54 to the audio processing circuit and the graphics processing circuit 24. For incoming data, or received data 46, the control circuitry 36 generates an enable signal 54 to enable the appropriate circuit 22 or 24 to receive the data. The control circuitry 36 also receives a data command signal 48 from the CPU via the local bus 18. The data command may be a read command, write command, a read and write command, and/or a processing command.

If the data command signal 48 is a write command, the received data 46 is provided to the appropriate circuit 22 or 24 and stored therein. If the data command signal 48 is a read command, the control circuitry 36 provides an enable signal and a read command signal to the appropriate circuit 22 or 24. The appropriate circuit provides an output that is provided to the output data switch 32. In particular, the audio processing circuit 22 produces an audio output data 58, and the graphics processing circuit 24 produces graphics output data 56. If the data command signal 48 is a write-modified read command, the control circuitry provides such an indication via the enable/command signal 54 to the appropriate circuit 22 or 24. The appropriate circuit then writes the data, performs the requested modification, and then provides the data to the output data switch 32.

The output data switch 32 receives the graphics output data 56 into a graphics buffer 38. Similarly, the output data switch 32 receives the audio output data 58 in an audio buffer 40. The graphics buffer 38 and the audio buffer 40 may be first in/first out ("FIFO") buffers. The output of the buffers are provided to multiplexor 42 which is controlled via an output data control signal 50. The control circuitry 36 generates the output data control signal 50 based on the addresses 44 and the data command signals 48. Based on this control signal 50, the multiplexor 42 outputs data as data output 52.

When the data commands are for the audio processing circuit or the graphics processing circuit 24 only, the data output 52 will be either the graphics output data 56 or the audio output data 58. If, however, multiple data command signals 48 are addressed to both the audio processing circuit and the graphics processing circuit to generate a stream of data, the output data 52 will be graphics output data 56 intermixed with the audio output data 58. This is shown graphically as an intermixed data output signal 52. Thus, by including a bus arbitration circuit, the video graphics processing and audio processing may be combined onto a single chip and/or printed circuit board requiring only a single local bus interface to the system bus and single connector to interface with the mother board. By combining the audio processing and video graphics processing, the cost for including audio processing in a computer is substantially reduced.

Figure 3:
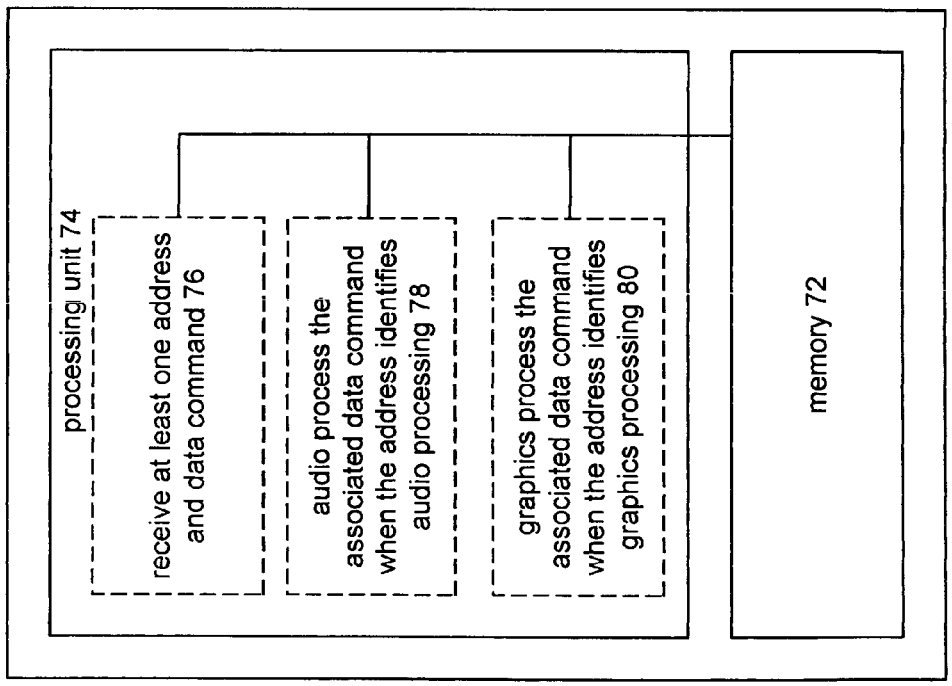
FIG. 3 illustrates a schematic block diagram of a video graphics and audio processing circuit in accordance with the present invention.

FIG. 3 illustrates a schematic block diagram of a video graphics and audio processing circuit 70. The processing circuit 70 includes memory 72 and a processing unit 74. The processing unit 74 may be a micro-processor, microcomputer, microcontroller, digital signal processor, CPU and/or any device which manipulates digital information based on programming instructions. The memory may be random access memory, read-only memory, magnetic tape memory, hard-drive memory, floppy disk memory, CD memory, DVD memory and/or any device that stores digital information.

The memory 72 stores programming instructions that, when read by the processing unit, causes the processing unit to function as a plurality of circuits 76-80. While reading the programming instructions, the processing unit functions as a circuit to receive at least one address and data command. The data command may be for inputting or outputting data from the processing circuit 70. The address will identify either audio processing or video processing. When a plurality of addresses are received, they may be for audio processing, video graphics processing or a combination thereof.

The processing unit 74 further executes programming instructions to function as circuit 78. As circuit 78, the processing unit audio processes the associated data command when the address identifies audio processing. The processing unit 74 also performs programming instructions that cause it to function as circuit 80. At circuit 80, the processing unit 74 graphic processes the associated data command when the address identifies graphic processing. The processing circuit 70 outputs the processed data, whether audio processed or graphics processed, to the system bus via a single local bus. As such, the audio and video graphics processing circuit may be implemented by a single processing unit or a plurality of processing units contained on a single chip and/or printed circuit board that includes a single local bus.

Figure 4:
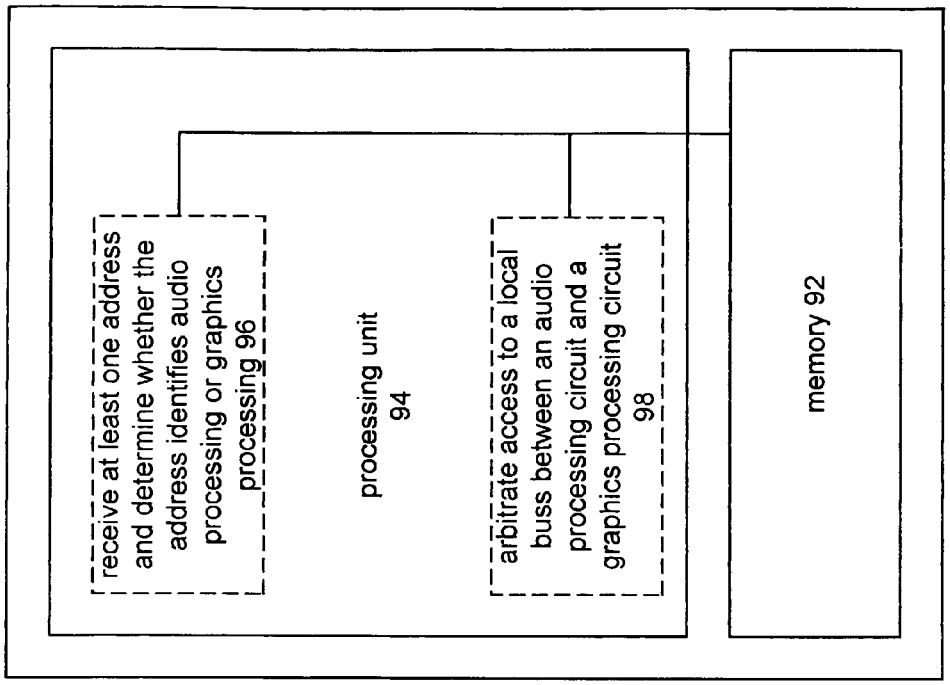
FIG. 4 illustrates a schematic block diagram of an arbitrator in accordance with the present invention.

FIG. 4 illustrates a schematic block diagram of an arbitrator 90. The arbitrator 90 includes memory 92 and a processing unit 94. The processing unit 94 may be a microcomputer, microprocessor, microcontroller, digital signal processor, central processing unit, digital logic control, and/or any other device that manipulates digital information based on programming instructions. The memory 92 may be read-only memory, random access memory, floppy disk memory, hard drive memory, magnetic tape memory, CD ROM memory, DVD memory, and/or any device that stores digital information.

The memory 92 stores programming instructions that, when read by the processing unit 94, causes the processing unit 94 to function as a plurality of circuits 96 and 98. While performing the programming instructions, the processing unit 94 functions as circuit 96. As circuit 96, the processing unit receives at least one address and determines whether the address identifies audio processing or graphics processing. The processing unit then functions as circuit 98 to arbitrate access to a local bus between an audio processing circuit and a graphics processing circuit. The programming instructions performed by the arbitrator 90 will be discussed in greater detail with reference to FIG. 5.

FIG. 5 illustrates a logic diagram of a method for arbitrating access to a local bus between a video graphics processing circuit and an audio processing circuit contained on the same single chip and/or printed circuit board. The process begins at step 100 where at least one address and an associated command is received. For each address received, there may be an associated command such that each request of the graphics and audio processing circuit is requesting a different action to be performed. For example, the associated command may be for inputting data (i.e., writing data), outputting data (i.e., reading data) or a write-modify read command.

The process then proceeds to step 102 where a determination is made as to whether the address or addresses identify the audio processing circuit or the graphics processing circuit. If the address or addresses only identify the audio processing circuit, the process proceeds to step 106. At step 106, the associated command is provided to the audio processing circuit and the audio processing circuit is provided with access to the local bus such that the processing of the command may be performed. If, however, the address or addresses only identify the video graphics processing circuit, the process proceeds to step 104. At step 104 the video graphics processing circuit is provided access to the local bus such that it may process the associated command or commands.

If, however, multiple addresses, or at least one, identify both the audio processing and graphics processing to produce a stream of data, the process proceeds to step 108. At step 108 access to the local bus is arbitrated between the audio processing circuit and the graphics processing circuit such that the respective circuits may perform the appropriate command. The arbitration will be based on the number of commands and/or the volume of data being processed by the appropriate circuits. As such, the video graphics circuit will have access to the local bus the majority of the time with the audio processing circuit being intermixed therewith. Such intermixing may be programmable to enhance performance of data throughput.

The preceding discussion has presented a method and apparatus for video graphics and audio processing being done on a single chip and/or printed circuit board. By integrating video graphics and audio processing onto a single chip and/or printed circuit board, the cost of adding audio processing into a computer is substantially reduced. As previously mentioned, the costs for a separate audio processing board is $30.00 retail and approximately $15.00 to manufacture. By integrating the audio processing onto the video graphics board, the cost is reduced to a few dollars of manufacturing cost.

What is claimed is:

1. A video graphics and audio processing circuit comprising:
   a graphics processing circuit;
   an audio processing circuit;
   a local bus operative to receive incoming data from a system bus and operatively coupled to the graphics processing circuit and the audio processing circuit; and
   a bus arbitrator operatively coupled to the local bus, the graphics processing circuit, and the audio processing circuit, wherein the bus arbitrator interprets the incoming data from the local bus and provides the incoming data to the audio processing circuit or to a video graphics processing circuit, and wherein the bus arbitrator arbitrates outputting data on the local bus from the graphics processing circuit and the audio processing circuit.

2. The video graphics and audio processing circuit of claim 1, wherein the bus arbitrator comprises an address decoder operatively coupled to receive an address via the local bus, to route received data to the audio processing circuit when the address identifies the audio processing circuit and to route received data to the graphics processing circuit when the address identifies the graphics processing circuit.

3. The video graphics and audio processing circuit of claim 2, wherein the address decoder comprises control circuitry that generates an output data control signal based on the address and a data command signal.

4. The video graphics and audio processing circuit of claim 3, wherein the bus arbitrator further comprises an output data switch operatively coupled to output data to the bus from the audio processing circuit or the graphics processing circuit based on the output data control signal.

5. The video graphics and audio processing circuit of claim 4, wherein the output data switch comprises an audio buffer that stores audio output data generated by the audio processing circuit, a graphics buffer that stores graphics output data generated by the graphics processing circuit, and a multiplexor operatively coupled to the audio buffer and the graphics buffer, wherein the multiplexor outputs the audio output data or the graphics output data based on the output data control signal.

6. A method for bus arbitration between an audio processing circuit and a graphics processing circuit, the method comprises:
   a) receiving at least one address;
   b) determining whether the at least one address identifies at least one of: the audio processing circuit and the graphics processing circuit; and
   c) when the at least one address identifies both the audio processing circuit and the graphics processing circuit, arbitrating access to a local bus coupled to the audio processing circuit and the graphics processing circuit.

7. The method of claim 6, wherein (a) further comprises receiving an associated command for each of the at least one address.

8. The method of claim 7 further comprises enabling the audio processing circuit to receive incoming data via the local bus when at least one address identifies the audio processing circuit and when the associated command is for inputting data.

9. The method of claim 7 further comprises enabling the graphics processing circuit to receive incoming data via the local bus when at least one address identifies the graphics processing circuit and when the associated command is for inputting data.

10. The method of claim 7 further comprises providing the audio processing circuit access to the local bus when the at least one address identifies the audio processing circuit and the associated command is for outputting data.

11. The method of claim 7 further comprises providing the graphics processing circuit access to the local bus when the at least one address identifies the graphics processing circuit and the associated command is for outputting data.

12. The method of claim 7, wherein the at least one address comprises a plurality of addresses.

13. The method of claim 12 further comprises intermixing the audio processing circuit's access to the local bus with the graphics processing circuit's access to the local bus based on the plurality of addresses and the associated command.

14. A video graphics and audio processing circuit comprising:
   a processing unit; and
   memory operatively coupled to the processing unit, wherein the memory stores programming instructions that, when read by the processing unit, cause the processing unit to receive at least one address and an associated data command, for each of the at least one address; audio process the associated data command when the at least one address identifies audio processing, and graphics process the associated data command when the at least one address identifies graphics processing.

15. The video graphics and audio processing circuit of claim 14, wherein the memory further comprises programming instructions that cause the processing unit to determine whether the associated data command is for inputting data or outputting data.

16. The video graphics and audio processing circuit of claim 15, wherein the memory further comprises programming instructions that cause the processing unit to intermix outputting audio data and graphics data when the at least one address includes a plurality of addresses that identify both the audio processing and graphics processing.

17. An arbitrator that arbitrates access to a local bus between graphics processing circuit and an audio processing circuit, the arbitrator comprising:
   a processing unit; and
   memory operatively coupled to the processing unit, wherein the memory stores programming instructions that, when read by the processing unit, cause the processing unit to receive at least one address, determine whether the at least one address identifies at least one of: the audio processing circuit and the graphics processing circuit; and arbitrate access to the local bus coupled to the audio processing circuit and the graphics processing circuit without an intervening bus when the at least one address identifies both the audio processing circuit and the graphics processing circuit.

18. The arbitrator of claim 17, wherein the memory further comprises programming instructions that cause the processing unit to receive an associated command for each of the at least one address.

19. The arbitrator of claim 18, wherein the memory further comprises programming instructions that cause the processing unit to enable the audio processing circuit to receive incoming data via the local bus when at least one address identifies the audio processing circuit and when the associated command is for inputting data.

20. The arbitrator of claim 18, wherein the memory further comprises programming instructions that cause the processing unit to enable the graphics processing circuit to receive incoming data via the local bus when at least one address identifies the graphics processing circuit and when the associated command is for inputting data.

21. The arbitrator of claim 18, wherein the memory further comprises programming instructions that cause the processing unit to provide the audio processing circuit access to the local bus when the at least one address identifies the audio processing circuit and the associated command is for outputting data.

22. The arbitrator of claim 18, wherein the memory further comprises programming instructions that cause the processing unit to provide the graphics processing circuit access to the local bus when the at least one address identifies the graphics processing circuit and the associated command is for outputting data.

23. The arbitrator of claim 18, wherein the at least one address comprises a plurality of addresses, and wherein the memory further comprises programming instructions that cause the processing unit to intermix the audio processing circuit's access to the local bus with the graphics processing circuit's access to the local bus based on the plurality of addresses and the associated command.

24. The video graphics and audio processing circuit of claim 1 were in the graphics processing circuit, the audio processing circuit and the bus arbitrator and configured on a single chip.

25. A video graphics and audio processing circuit comprising:
   a graphics processing circuit;
   an audio processing circuit;
   a local bus operative to receive incoming data from a system bus and operatively coupled to the graphics processing circuit and the audio processing circuit;
   a bus arbitrator operatively coupled to the local bus, the graphics processing circuit, and the audio processing circuit, wherein the bus arbitrator interprets the incoming data from the local bus and provides the incoming data to the audio processing circuit or to the video graphics processing circuit, and wherein the bus arbitrator arbitrates outputting data on the local bus from the graphics processing circuit and the audio processing circuit;
   wherein the bus arbitrator further comprises an output data switch operatively coupled to output data to the bus from the audio processing circuit or the graphics processing circuit based on an output data control signal; and
   wherein the output data switch comprises an audio buffer that stores audio output data generated by the audio processing circuit, a graphics buffer that stores graphics output data generated by the graphics processing circuit, and a multiplexor operatively coupled to the audio buffer and the graphics buffer, wherein the multiplexor outputs the audio output data or the graphics output data based on the output data control signal.

* * * * *